Feb. 13, 1968   L. FAUST ET AL   3,368,860
BINOCULAR WITH PROTECTIVE DEVICE FOR ITS
CLOSED KNUCKLE JOINT
Filed April 22, 1964   5 Sheets-Sheet 4

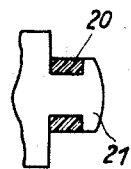
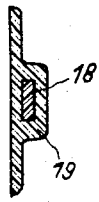
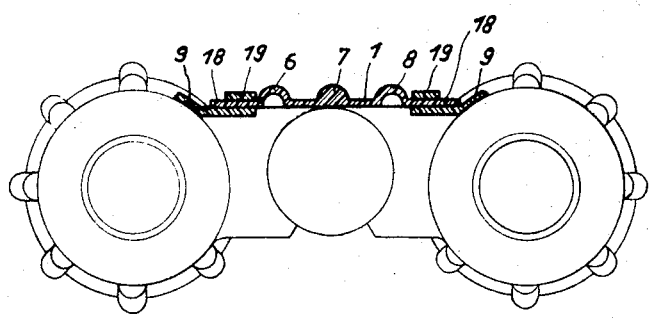
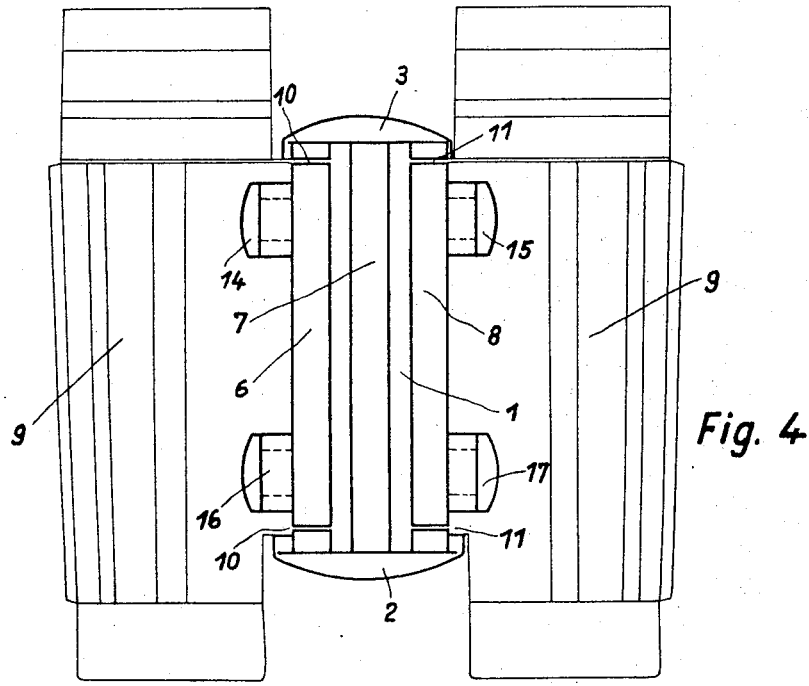

Feb. 13, 1968   L. FAUST ET AL   3,368,860
BINOCULAR WITH PROTECTIVE DEVICE FOR ITS
CLOSED KNUCKLE JOINT
Filed April 22, 1964   5 Sheets-Sheet 5

United States Patent Office 3,368,860
Patented Feb. 13, 1968

3,368,860
BINOCULAR WITH PROTECTIVE DEVICE FOR ITS CLOSED KNUCKLE JOINT
Ludwig Faust, Braunfels, near Wetzlar, and Erwin Altenheiner, Hasselborn, Kreis Wetzlar, Germany, assignors to Carl Zeiss-Stiftung, doing business as Carl Zeiss, Heidenheim (Brenz), Wurttemberg, Germany, a corporation of Germany
Filed Apr. 22, 1964, Ser. No. 361,723
Claims priority, application Germany, Apr. 24, 1963, H 44,677
8 Claims. (Cl. 350—71)

ABSTRACT OF THE DISCLOSURE

Binoculars having shock absorbing sheathings on their two lens containing casings and in addition thereto a shock absorbing device for the knuckle joint which connects said casings. The shock absorbing device comprises two caps attached to and covering the ends of the knuckle joint. The caps are integrally formed on the ends of a bar-shaped member extending loosely along the entire length of the knuckle joint.

---

The invention relates to a binocular having a closed knuckle joint.

It is known to provide the two lens containing casings of binoculars with a rubber sheathing to protect them against injury. It is also known to provide certain types of binoculars with a protection for their knuckle joints which consists of a part encompassing the knuckle joint. Such a protective cover is, however, not applicable to binoculars having a closed knuckle joint so that the knuckle joint of binoculars of this type heretofore remained unprotected.

It is the object of the invention to provide an effective protection for the closed knuckle joint of a binocular whose body is protected by a rubber sheathing, in that the knuckle joint is covered by a shock absorbing material.

Preferably, the protective cover consists of two caps which are attached to the ends of the knuckle joint and which protect said ends, and of a center portion loosely placed on the knuckle joint. The caps may either embrace the knobs provided at the ends of the knuckle joint, or they may be glued to these knobs. The loose center portion is integrally connected with the two caps and is retained by the same on the knuckle joint. In the expanded condition of the binocular the ends of the center portion are moved over the rubber sheathing, while in the folded condition of the binocular the center portion ends are flush with the rubber sheathing.

In a modified form of the invention the ends of the loose center portion are fixedly attached to the rubber sheathing. In this embodiment of the invention said ends are adapted to be expanded in an accordion-like fashion in order to permit a folding of the binocular. For this purpose the center portion is preferably provided with longitudinal ribs of which at least two are hollow and able to yield when the binocular is folded.

The ends of the loose center portion are cemented to the rubber sheathing; but there may also be provided a press button connection between the rubber sheathing and the center portion. Furthermore, the ends of the center portion may be provided with tabs which fit into corresponding slits in the rubber sheathing. It is also possible for fastening the ends of the loose center portion to make the connection of said ends with the rubber sheathing in the form of hinges, or to provide said ends each with a specially shaped bar adapted to slide into a groove in the rubber sheathing.

Preferably, between the center portion and the two adjacent caps and below each cap are provided two slits for the purpose of preventing the loose center portion from being restricted in its expansion by the caps fixedly adhering to the knuckle joint ends when the binocular is folded.

In another modification of the invention the ends of the rubber sheathing are extended beyond the binocular body and drawn into the joint after a corresponding amount of material has been removed therefrom. The rubber sheathing is provided at each of the two edges with a bead. In the straight condition of the binocular these two beads are positioned one next to the other. When the binocular is folded, the two beads are moved apart and expose the folding axis. The height of the beads, however, is such that the folding axis is still protected against shocks from wide articles.

The invention will now be described in detail with reference to the accompanying drawings which illustrate several embodiments and in which.

Figure 9:
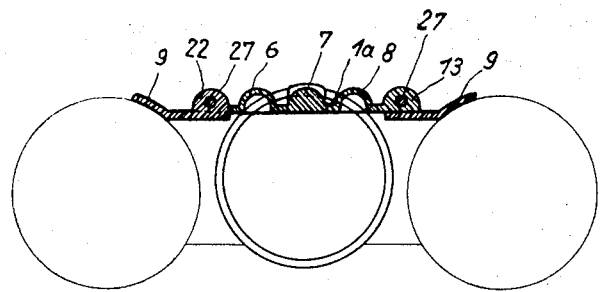
Figure 8:
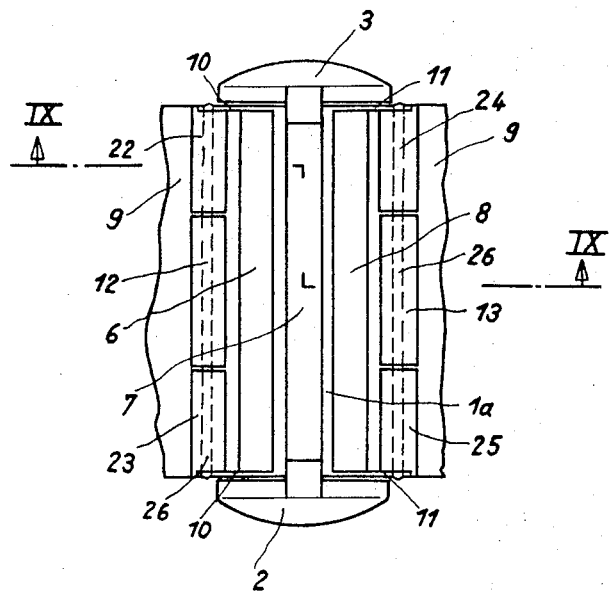
Figure 11:
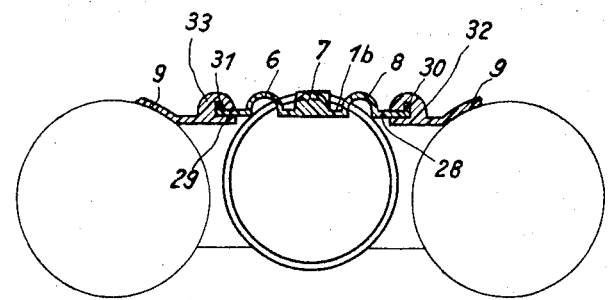
Figure 10:
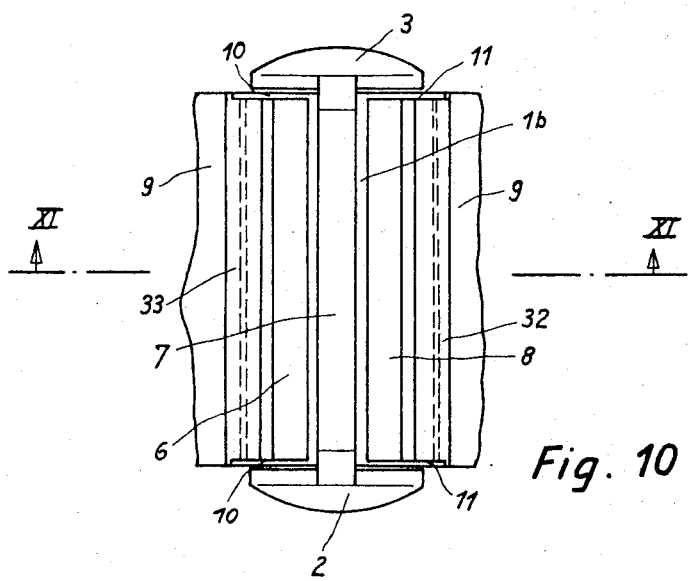
Figure 13:
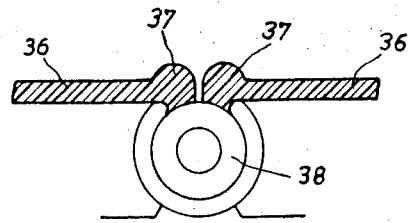
Figure 12:
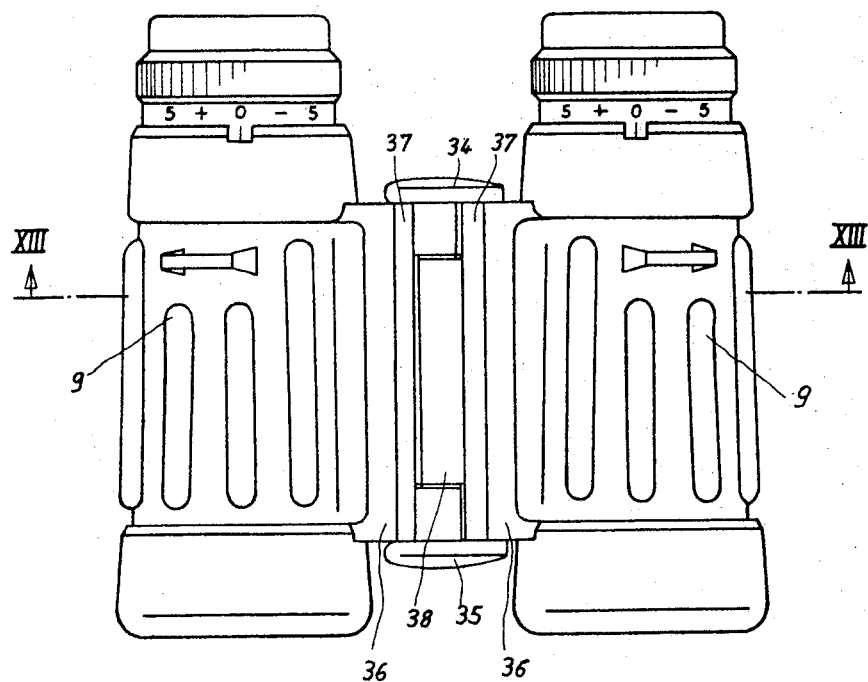

FIG. 4 indicates a binocular with a rubber sheathing and a knuckle joint protective device;

FIG. 5 is a top elevation view of FIG. 4 with parts in cross section;

FIG. 6 illustrates a detail of FIG. 5 in an enlarged scale;

FIG. 7 illustrates a modified detail in a view similar to FIG. 6;

FIG. 8 illustrates another modification of the knuckle protective device in side elevation;

FIG. 9 is a cross sectional view along the broken line IX—IX of FIG. 8;

FIG. 10 illustrates still another modification of the knuckle protective device in side elevation;

FIG. 11 is a cross-sectional view along the line XI—XI of FIG. 10;

FIG. 12 illustrates in a side elevation view a binocular with still another knuckle joint protective device, and FIG. 13 is a sectional view of a detail taken along the line XIII—XIII of FIG. 12.

Figure 1:
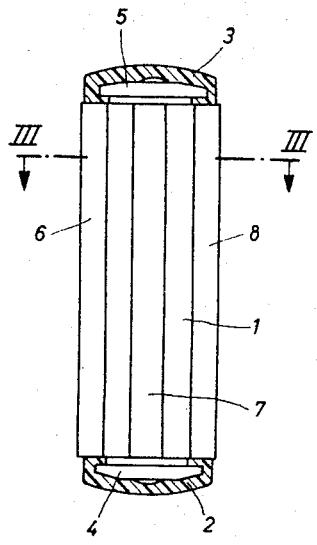
FIG. 1 illustrates a longitudinal sectional view of a knuckle joint protective device.
Figure 2:
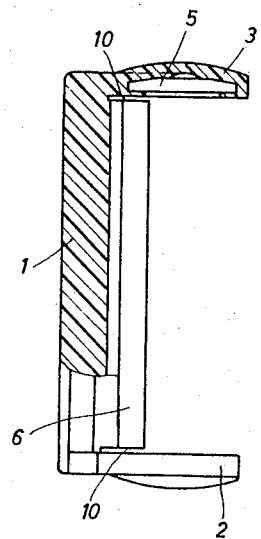
FIG. 2 is a side elevation view of the protective device, partly in section.
Figure 3:
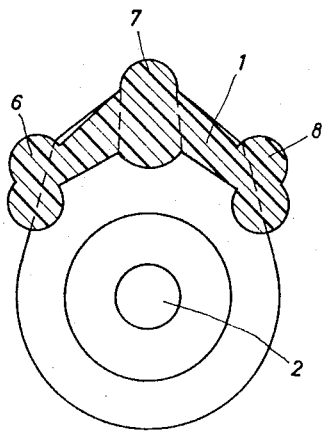
FIG. 3 is a cross-sectional view along the line III—III of FIG. 1.

Referring to FIG. 1, the protective cover of the knuckle joint according to the invention consists of a bar-shaped center portion 1 and the caps 2 and 3. The caps 2 and 3 contain hollow spaces 4 and 5, respectively, which serve to receive the knobs provided at the two ends of the knuckle joint. The caps are either adhesively fixed to the knobs or they are pulled around the same, as is shown in FIGS. 1 and 2. The bar-shaped center portion 1 is provided with a number of longitudinal ribs 6, 7 and 8 which have the shape of rounded beads formed similarly to ribs on the rubber sheathing (FIG. 3). In the straight condition of the binocular the outer ribs 6 and 8 of the center portion 1 slide over the rubber sheathing. The caps 2 and 3 and the center portion 1 consist of one piece so that the bar-shaped portion 1 is retained on the knuckle joint by the caps 2 and 3.

It is advantageous to fixedly attach the ends of the center portion 1 to the rubber sheathing 9 of the binocular, as shown in FIG. 4. In order to permit the center portion 1 to expand when the binocular is folded, the ribs 6 and 8 are hollow (FIG. 5). To prevent a restriction of the expansion capacity of the center portion 1 by the caps 2 and 3 when the binocular is folded, there are provided between center portion and caps and below each cap two slits 10 and 11.

The ends 12 and 13 of the center portion 1 may be attached to the rubber sheathing 9 in different ways. FIG. 4 shows an embodiment in which the center portion 1 is provided with four tabs 14, 15, 16, 17 which extend beyond the rubber sheathing 9. These tabs may be attached to the rubber sheathing by means of a press button connection; they may also be formed to fit into corresponding slits in the rubber sheathing 9. Thus, the tabs 14, 15, 16, 17 may have tongues 18 which are pushed into loops 19 on the rubber sheathing 9 (FIG. 6), or each tab is provided at its end with a notch 20 which is engaged by a part 21 of the rubber sheathing 9 (FIG. 7).

FIG. 8 illustrates a knuckle joint protective device whose center portion 1a has two ends 12 and 13 which together with corresponding parts 22, 23 and 24, 25 of the rubber sheathing 9 form a hinge. The ends 12, 13 and the parts 22, 23 and 24, 25 are provided with a bore 26 into which a pin 27 is inserted.

FIG. 10 illustrates a further embodiment of the protective device for a knuckle joint according to the invention. The center part 1b is provided at each of its ends 28, 29 with a bar 30 and 31, respectively (FIG. 11). The rubber sheathing 9 has on its ends two ribs 32, 33 which are each provided with a groove for receiving the angular shaped edge of the bars 30 and 31, respectively. For fastening the center portion 1b of the knuckle joint protective device to the rubber sheathing 9, the two bars 30, 31 are slidably pushed into the grooves of the ribs 32, 33 respectively.

FIG. 12 illustrates a binocular enclosed by a rubber sheathing 9. The ends of the knuckle joint are protected by caps 34, 35 which are either cemented to knobs provided at the knuckle joint ends or which surround these knobs. The rubber sheathing 9 is provided at each side with an extension 36 which reaches over the knuckle joint and is pulled into the hinge 38. On each extension is arranged close to the outer edge a bead 37 (FIG. 13). If the binocular is straightened, the two beads 37 are positioned one next to the other and form a good cover for the knuckle joint. When the binocular is folded, said two beads 37 move apart so that the folding axis is exposed. The beads 37 are, however, of such a height that they are able to ward off any blows by wide articles against the knuckle joint.

What we claim is:

1. In a binocular provided with two lens containing casings, a closed knuckle joint connecting said casings with each other, and rubber sheathings covering the two lens containing casings, the improvement comprising a shock absorbing device for said knuckle joint, said shock absorbing device comprising two caps attached to and covering the ends of said knuckle joint, a bar-shaped portion including ends extending loosely along the entire length of said knuckle joint and integrally connected at each end to the circumference of said two caps and said bar-shaped portion having longitudinal edge portions which are secured to the adjacent portions of said rubber sheathings and which are expandable transversely.

2. A binocular according to claim 1, in which said bar-shaped portion is provided with a plurality of lengthwise extending spaced parallel ribs of which at least two are hollow.

3. A binocular according to claim 1, including tabs on the longitudinal edges of said bar-shaped portion, said tabs being secured to the adjacent portions of said rubber sheathings on said casings.

4. A binocular according to claim 1, including press button fasteners for securing the longitudinal edges of said bar-shaped portion to the adjacent portions of said rubber sheathings on said casings.

5. A binocular according to claim 1, in which said longitudinal edges of said bar-shaped portion are secured by a hinge connection to the adjacent portions of said rubber sheathings on said casings.

6. A binocular according to claim 1, including angularly formed longitudinal members on both longitudinal edges of said bar-shaped portion, said angularly formed longitudinal members being secured to the adjacent portions of said rubber sheathings on said casings by engaging slots provided in the adjacent portions of said rubber sheathings.

7. A binocular according to claim 1, in which said bar-shaped portion is provided adjacent said caps with transverse slits for facilitating the attachment of said shock absorbing device to the ends of said knuckle joint.

8. In a binocular provided with two lens containing casings, a closed knuckle joint including a hinge connecting said casings with each other, and rubber sheathings covering said two lens containing casings, the improvement residing in a shock absorbing device which includes two caps attached to and covering the ends of said knuckle joint and extensions formed integrally with said rubber sheathings and having free ends adjacent said knuckle joint and extending along the entire length thereof, each free end including an inward projection contoured to slidably engage said hinge of said knuckle joint and an outwardly projecting enlarged bead portion, said enlarged bead portions being positioned next to each other when said binocular is straightened to form a shock absorbing cover for said knuckle joint.

References Cited

UNITED STATES PATENTS

| 2,813,564 | 11/1957 | Benz | 150—52.8 |
| 3,020,802 | 2/1962 | Rantsch et al. | 350—65 X |
| 3,033,079 | 5/1962 | Havpt et al. | 350—71 X |

FOREIGN PATENTS 319,977    4/1920    Germany.

DAVID H. RUBIN, *Primary Examiner.*

T. H. KUSMER, *Assistant Examiner.*